United States Patent
Cho (10) Patent No.: US 6,808,637 B2
(45) Date of Patent: Oct. 26, 2004

(54) SYSTEM FOR PRODUCING OZONE WATER AND CONTROL METHOD THEREOF

(75) Inventor: Soo Hawn Cho, Seoul (KR)

(73) Assignee: Dong Woo Kiyoun Inc., Kyungki-Do (KR)

(*) Notice: Subject to any disclaimer, the term of this patent is extended or adjusted under 35 U.S.C. 154(b) by 181 days.

(21) Appl. No.: 10/183,535

(22) Filed: Jun. 28, 2002

(65) Prior Publication Data

US 2003/0183585 A1 Oct. 2, 2003

(30) Foreign Application Priority Data

Mar. 29, 2002 (KR) .................................. 2002-0017219

(51) Int. Cl.⁷ .................................................. C02F 1/78
(52) U.S. Cl. .................. 210/744; 210/760; 210/109; 210/136; 210/218; 261/DIG. 42; 261/DIG. 75
(58) Field of Search ................................ 210/744, 760, 210/109, 110, 136, 188, 198.1, 205, 218; 96/146; 261/DIG. 42, DIG. 75; 422/186.03, 186.2

(56) References Cited

U.S. PATENT DOCUMENTS

| | | | | |
|---|---|---|---|---|
| 4,049,552 A | * | 9/1977 | Arff | 210/192 |
| 5,213,773 A | * | 5/1993 | Burris | 422/256 |
| 5,427,693 A | * | 6/1995 | Mausgrover et al. | 210/739 |
| 5,494,576 A | * | 2/1996 | Hoppe et al. | 210/198.1 |
| 6,106,731 A | * | 8/2000 | Hayes | 210/760 |
| 6,146,524 A | * | 11/2000 | Story | 210/199 |
| 6,267,878 B1 | * | 7/2001 | Kerchouche et al. | 210/96.1 |
| 2002/0134736 A1 | * | 9/2002 | Burris et al. | 210/760 |
| 2003/0080037 A1 | * | 5/2003 | Mazzei | 210/188 |

* cited by examiner

Primary Examiner—Frank M. Lawrence
(74) Attorney, Agent, or Firm—G W i P S (57) ABSTRACT

An ozone water producing system and control method, which is flexibly used indoor or outdoor irrespective condition of a flow channel, is provided for reconstituting polluted water as environmentally friendly. The ozone water generating system is maintained in an optimum state for improving entire performance of the system as well as predicting and preventing the backflow of ozone water, which is occurred due to outlet blocking in a discharging process. The controlling method of the present ozone water producing enables to prevent the deteriorating the performance and ensure the operation stability. The ozone water-producing system comprises an influent air controller, an injector, a gas-liquid separator, and an ozone water-backflow, preventing device. The present system and controller is designed to prevent water backflow, being frequently occurred in the conventional system, for improving the performance, stability and extending operating lifetime. Therefore, it is possible to manufacture a highly reliable ozone water-producing apparatus.

5 Claims, 7 Drawing Sheets

| DIVISION | HEATER(43) | | HEATER(43a) | | REMARKS |
|---|---|---|---|---|---|
| OZONE GENERATOR | CONTINUOUS | | CONTINUOUS | | CONTINUOUSLY OPERATING UNTIL VALVES ARE SWITCHED OFF |
| WATER SOLENOID VALVE | CONTINUOUS | | CONTINUOUS | | |
| AIR SOLENOID VALVE | ③→① 5 HOURS ON | ②→① 5 HOURS OFF | ③→① 5 HOURS OFF | ②→① 5 HOURS ON | CONTINUOUSLY & REPEATEDLY OPERATING UNTIL DRIVING CIRCUIT IS SWITCHED OFF |
| HEATER(43) | 5 HOURS OFF | | 1 HOUR ON/ 4 HOURS OFF | | |
| HEATER(43a) | 1 HOUR ON/ 4 HOURS OFF | | 5 HOURS OFF | | |

SYSTEM FOR PRODUCING OZONE WATER AND CONTROL METHOD THEREOF

BACKGROUND OF THE INVENTION

1. Field of the Invention

The present invention relates to a system for producing ozone water containing dissolved ozone in which polluted water is reproduced as environmentally friendly. More particularly, the present invention relates to an ozone water-producing system and its control method in which an ozone water-producing apparatus can be all purposely used indoors or outdoors irrespective of the condition of a flow channel. The condition of ozone generation is maintained in an optimum state so as to improve the performance of the system in its entirety, as well as to mitigate the symptom of the backflow of the ozone water due to a blocking of an outlet in the process of discharging. The ozone water is previously detected to prevent deterioration of the system performance and ensure stability in use.

2. Background of the Related Art

In general, it is known that an ozone water-producing apparatus that can obtain ozone water by mixing and dissolving ozone into water utilizes the strong oxidation effects of ozone for the purpose of purification and disinfections. The ozone water-producing apparatus can be classified into a pressurized injector type, a diffused air type or a venturi injector type, etc., depending on the ozone water-producing method.

Figure 1:
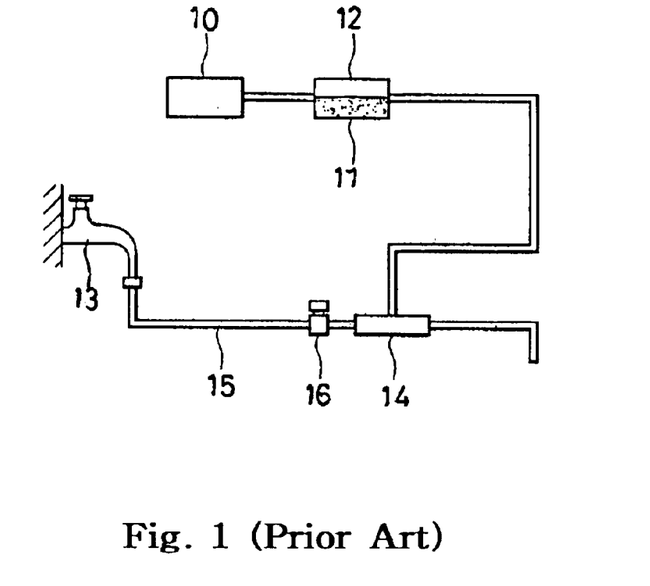
FIG. 1 is a schematic elevation partly in section illustrating a general ozone water producing apparatus.

Among them, a typical ozone water-producing apparatus of the pressurized injector type, as shown in FIG. 1, includes an air pump 10 which sucks external air to provide to the apparatus as intake air, an ozone generator 11 with an ozone-generating unit 12 for changing oxygen contained in the air supplied from the air pump 10 into ozone to generate ozone, a mixer 14 for mixing the ozone supplied from the ozone generator 12 with water supplied from a water source 13, a solenoid valve 16 installed in a water supply line 15 to control a flow of the water supplied to the mixer 14 from the water source 13, etc.

The ozone water-producing apparatus is configured in such a fashion that when the air pump 10 supplies air to the ozone-generating unit 12 compulsorily, the ozone-generating unit 12 changes oxygen in the air into ozone. At this time, although a portion of the changed ozone is again decomposed into oxygen, most of the ozone is pushed into the mixer 14 which, in turn, mixes the ozone into water supplied from the water source 13 so as to discharge ozone water.

Accordingly, in such a pressurized injector type ozone water-producing apparatus, the ozone is sucked into the mixer 14 by the negative pressure generated when water from the water source 13 passes through the water supply line 15 while pressure is generated by the air pump 10 so as to discharge ozone water where gas and liquid are mixed, i.e., water which contains dissolved ozone.

The ozone water-producing apparatus requires various peripherals since maintaining a suitable degree of water and ozone mixing relates to the performance of the apparatus. Examples of auxiliary devices for stably and uniformly maintaining the mixing state of water and ozone to provide optimum water containing dissolved ozone include a mixer for mixing ozone and water, an injector for generating a negative pressure, a gas-liquid separator for controlling the amount of air introduced thereto or separating gas and liquid, etc.

Examples of techniques for providing an improved ozone water-producing system through a modification of the arrangement and structure of the ozone water-producing apparatus are described below. The Korean Utility Model Registration No. 208,109, introduced by the applicant of the present invention, discloses an apparatus for producing ozone water in which a solenoid valve (injector) is modified, a bubble separator is installed in an ozone supply line connected to an inlet of a mixer. In this system only an increase in water pressure permits the inflow of ozone without an air pump, the discharge of surplus ozone not mixed into the water is prevented and a reduction in the number of components and miniaturization achieved according to the absence of the air pump in the overall construction. Also, various problems associated with a re-use of the ozone including possible physical harm to humans due to the ozone as well as breakage of the peripheral components are resolved.

Another Korean Utility Model Registration No. 203,244, introduced by the applicant of the present invention, discloses an apparatus for producing ozone water in which a problem associated with security of the length of a flow channel due to an additional installation of a solenoid valve and an injector on the flow channel is overcome in such a manner that the flow channel length is shortened and an air pump is replaced while obtaining suitable ozone water through an integrated application of the solenoid valve and injector.

However, such conventional arts are directed to a modified structure of a flow channel for mixing artificially generated ozone and water. Particularly, there has been a problem in that the use of air containing foreign substance and moisture to generate ozone causes deterioration of the ozone-producing efficiency.

In addition, there occurs a frequent blocking of an outlet of ozone water during system operation. In this case, the ozone water deviates from a normal flow path and flows backwards so that a mixed balance between water and ozone is destroyed, simultaneously making the normal discharging of ozone water impossible. As a result, along with a decrease in the entire flow channel performance, a user can feel inconvenienced by having the need to obtain maintenance and repair of the system from those highly skilled in the art.

Moreover, there has not been suggested a concrete approach for efficient control, a concrete system design and an ozone water producing apparatus that can be easily and simply utilized in home, public facilities or the like.

SUMMARY OF THE INVENTION

Accordingly, the present invention is directed to an ozone water-producing system and its control method that substantially obviates one or more problems due to limitations and disadvantages of the related art.

An object of the present invention is to provide an ozone water producing system, which can be all purposely used indoors or outdoors irrespective of the condition of a flow channel.

Another object of the present invention is to provide an ozone water-producing system that maintains the condition of ozone generation of the system in an optimum state to achieve an improved performance in its entirety.

Still another object of the present invention is to provide an ozone water-producing system that preemptively detects a symptom of the backflow of ozone water due to a blocking of an outlet in the process of discharging the ozone water to prevent deterioration of the system performance and ensure stability in use.

Yet another object of the present invention is to provide an ozone water-producing system that controls relatively frequently occurring backflow of water during the operation of the ozone water-producing system to allow the system to operate normally.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as in the appended drawings.

To achieve these objects and other advantages, and in accordance with the purpose of the invention as embodied and broadly described herein, according to an aspect of the present invention, there is provided an ozone water-producing system including, an ozone generator having an ozone-generating unit for receiving air and changing oxygen contained in the air into ozone, a mixer adapted to mix the ozone supplied from the ozone generator with water supplied from a water source, a solenoid valve installed in a water supply line to control the flow of the water supplied to the mixer from the water source, and a gas-liquid separator adapted to separate gas and liquid.

The ozone water-producing system comprising: influent air control means adapted to purify and dehumidify introduced air that passes through an air solenoid valve installed in the flow path of ambient air introduced into an ozone generator; an injector connected to a water supply line and an ozone gas supply line so as to form an ozone gas with air purified and dried through the influent air control means and mix the ozone gas with water, the injector adapted to open a check valve installed at a position where the ozone gas supply line and the water supply line meet by means of water injection via the Venturi effect to allow the ozone gas to be dissolved into water; a gas-liquid separator having a certain space enabling a separation of gas and liquid and adapted to perform a repeated ozone dissolving process in such a manner that it receives first ozone water obtained by mixing and dissolving the ozone gas into the water via the injector, allows ozone to subsequently be dissolved into water to produce second ozone water in the gas-liquid separator and discharges ozone water of a liquid state where ozone is dissolved into water during the formation of the second ozone water through a drainpipe while allowing ozone in a gaseous state which is not dissolved into water to re-enter the gas-liquid separator through a return line to allow ozone to thirdly be dissolved into water to produce ozone water in the gas-liquid separator; and ozone water-backflow preventing means installed along the interior space of the gas-liquid separator and adapted to detect a limited water level of the ozone water introduced into the gas-liquid separator and control the flow of water through the water supply line according to the flow state of the ozone water in order to prevent a backflow of the ozone water.

According to another aspect of the present invention, there is also a method of controlling an ozone water-producing system for producing ozone, comprising the steps of:

supplying water to the interior of the system by opening a water solenoid valve serving to open and close a water supply line in a driving circuit board, and mixing ozone into the water by increasing a flow rate of the water through an injector and sucking the ozone into the injector;

separating ozone from water through a gas-liquid separator to dissolve ozone into water containing dissolved ozone while restricting a discharge of ozone which is not dissolved in the water so as to re-dissolve ozone into the water;

continuously supplying water to the gas-liquid separator in the gas-liquid separating process and, in response to a blocking of an outlet provided on the lower portion of the gas-liquid separator, detecting a state where a discharge of water is stopped as an abnormal water level in the gas-liquid separator;

blocking the water solenoid valve and opening the outlet on the lower portion of the gas-liquid separator to discharge water from the gas-liquid separator through the outlet if water level detecting information of the gas-liquid separator contains a full water level; and identifying a discharge state of water through a detecting sensor after all the water in the gas-liquid separator is discharged and actuating the water solenoid valve to re-supply water to the gas-liquid separator through the water supply line after an optional delay time elapses.

According to the ozone water-producing system, the condition of ozone generation is maintained in an optimum state to improve stability and performance of the system in its entirety. Further, the re-circulation of ozone increases the amount of dissolved ozone, reduces inconvenience according to maintenance and repair of the system, and allows the system to be flexibly used indoors or outdoors irrespective of the condition of a flow channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a view illustrating an influent air control unit of the present invention, in which FIG. 3(*a*) is an elevation view in section of the unit, and FIG. 3(*b*) is a side view in section of FIG. 3(*a*).

DETAILED DESCRIPTION OF THE PREFERRED EMBODIMENTS

Reference will now be made in detail to the preferred embodiments of the present invention, examples of which are illustrated in FIGS. 2 to 9.

An ozone water-producing system according to the present invention includes an ozone generator having an ozone-generating unit for receiving air and changing oxygen contained in the air into ozone to generate the ozone, a mixer adapted to mix the ozone supplied thereto from the ozone generator with water supplied thereto from a water source and a solenoid valve installed in a water supply line to control a flow of the water supplied to the mixer from the water source, an influent air control unit, an injector, a gas-liquid separator, and a unit for preventing backflow of ozone water in the gas-liquid separator.

Figure 2:
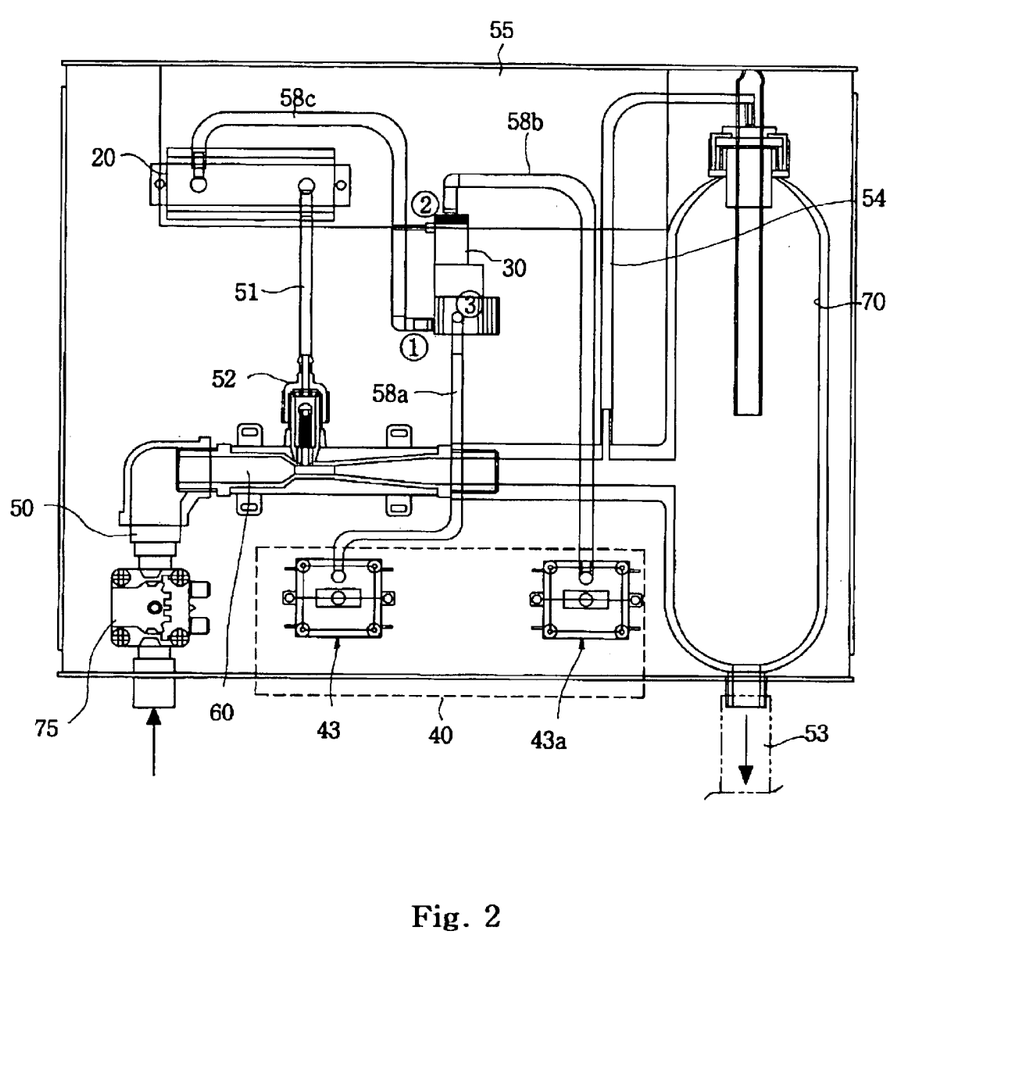
FIG. 2 is a view illustrating the overall construction of an ozone water producing system according the present invention.

As shown in FIG. 2, the influent air control unit 40 functions to purify and dehumidify intake air through an air solenoid valve 30 installed in the flow path of ambient air introduced into an ozone generator 20. The injector 60 is connected to a water supply line 50 and an ozone gas supply line 51 so as to form an ozone gas with air purified and dried through the influent air control unit 40 and mix the ozone gas with water, and opens a check valve 52 installed at a position where the ozone gas supply line 50 and the water supply line 51 meet by means of water injection through a flow rate of water to allow the ozone gas to be dissolved into water. The gas-liquid separator 70 has a certain space permitting a separation of gas and liquid so that it receives first ozone water obtained by dissolving the ozone gas into the water via the injector 60 to mix water and ozone so as to produce second ozone dissolved water, and discharges ozone water in a liquid state where ozone is dissolved into water during the formation of the second ozone dissolved water through a drainpipe 53 while allowing ozone in a gaseous state which is not dissolved into water to re-enter the gas-liquid separator through a return line 54 to experience third or more ozone dissolving process. The ozone water-backflow preventing unit is installed along the interior space of the gas-liquid separator 70 to detect a limited water level of the ozone water introduced into the gas-liquid separator 70 and control the flow of water flowing through the water supply line 50 according to the flow state of the ozone water to prevent a backflow of the ozone water.

Figure 3A:
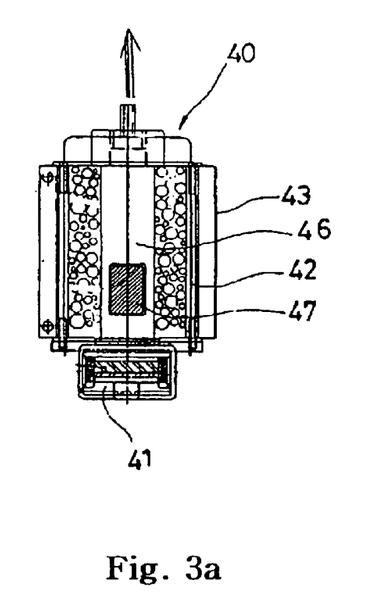
Figure 3B:
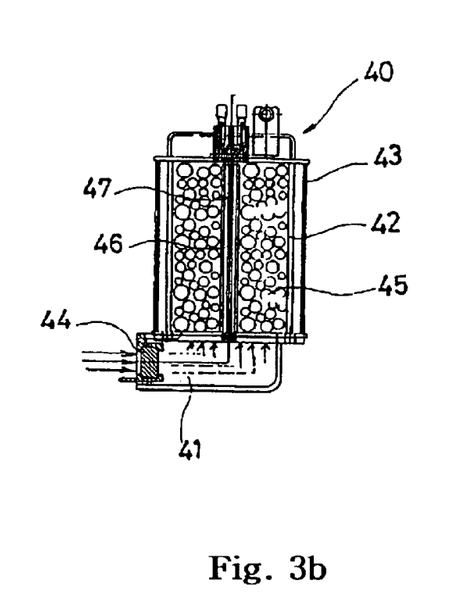

The influent air control unit 40, as shown in FIGS. 2 and 3, includes a heater 43 on a jacket 42 having an air intake port 41 and an empty interior space, a filter 44 installed at the air intake port 41 of the jacket 42 for filtering sucked air, a dehumidifying layer 45 disposed in the empty interior space of the jacket 42 for removing moisture contained in air passing through the filter 44. An electrode plate 46 is installed in the jacket 42 and generates heat by means of a Positive Temperature Coefficient (PTC) thermostat element. The dehumidifying layer 45 is filled with silica gel, i.e., a kind of drying agent, that purifies ambient air introduced into the ozone generator 20 and removes moisture contained in the air to allow moisture-free air to enter an ozone-generating unit (not shown) of the ozone generator 20.

As is the case with the heaters 43 and 43a, as shown in FIG. 2, one or more heaters may be arranged around an air solenoid valve 30 communicating with an air inflow line forming a flow channel together with the ozone generator 20.

For example, the heaters 43 and 43a may be configured in such a manner that the heater 43 is used for purifying and drying air to allow it to enter the ozone generator 20 via the air solenoid valve 30, while another heater 43a is used for actuating the PTC thermostat element 47 to dry silica gel that contains moisture in response to an operating signal of an operating circuit board 55 and both are connected to the air solenoid valve 30.

The heaters 43 and 43a are connected to the air solenoid valve 30 through ambient air inflow lines 58a and 58b, respectively, so air first passes through the air solenoid valve 30 and one side flow channel of the air solenoid valve 30 is connected to the ozone generator 20 through an air supply line 58c.

Figure 4:
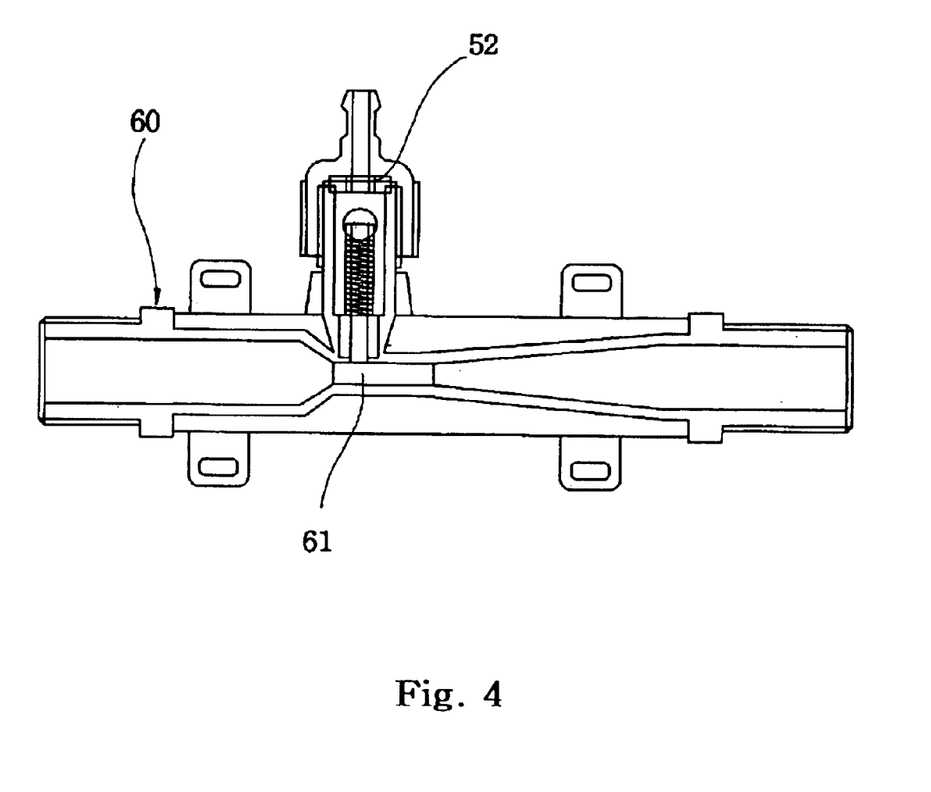
FIG. 4 is a schematic view illustrating the construction of an injector of the present invention.

As shown in FIGS. 2 and 4, the injector 60 is connected at one end to the water supply line 50 and connected at the other end to the gas-liquid separator 70. A check valve 52 is installed on the external side of the region of the injector 60 where a flow channel narrows so that it can be opened or closed under a certain pressure, and includes an injector hole 61 for allowing the passage of ozone gas into the flow channel of the injector through the check valve, as induced via the Venturi effect due to the high speed flow of water supplied to the injector through the water supply line.

Figure 5:
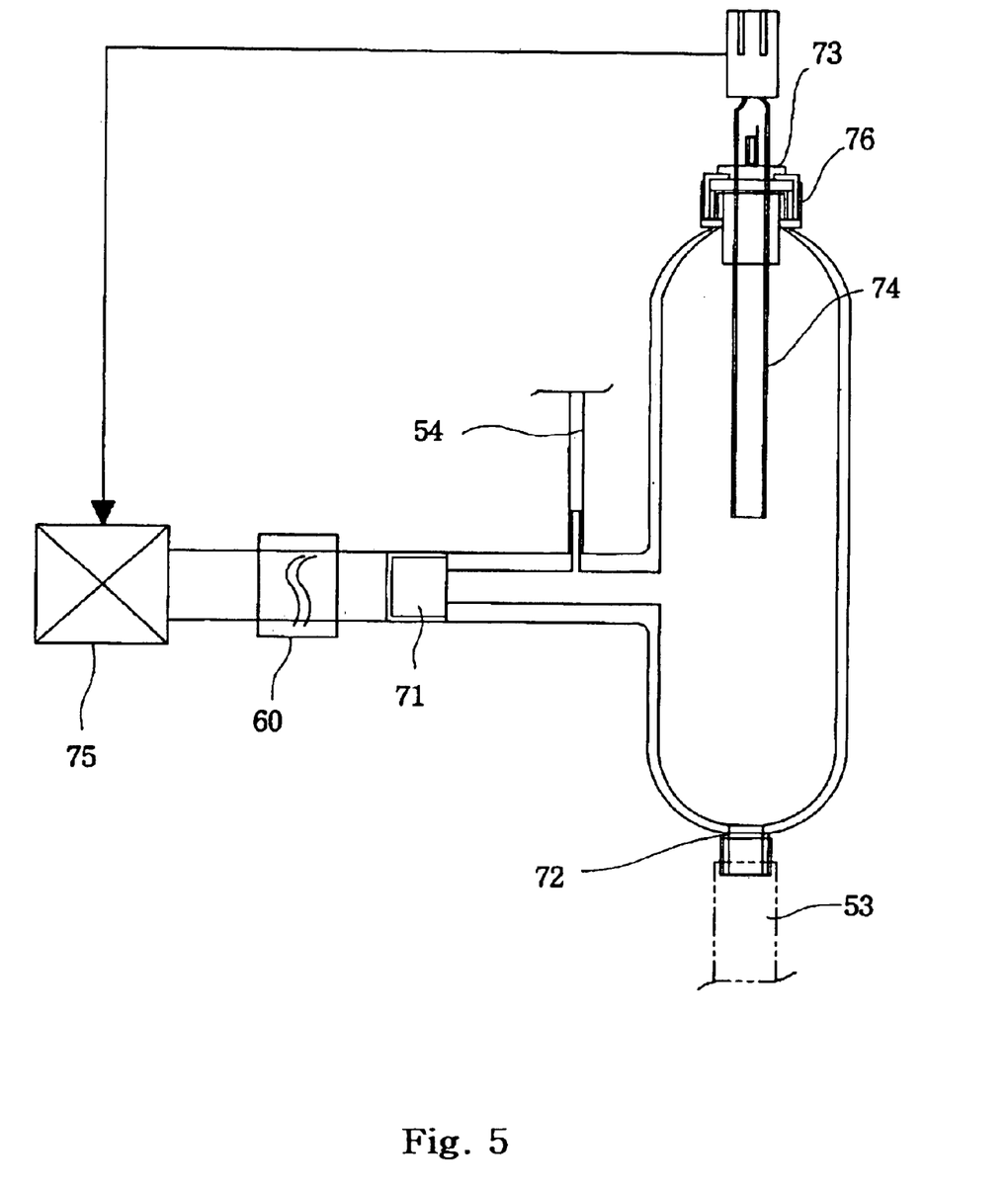
FIG. 5 is a sectional view illustrating the inner construction of a gas-liquid separator and a water-backflow preventing unit according to the present invention.

As shown in FIGS. 2 and 5, the gas-liquid separator 70 is configured in such a manner that its shape is selected to give a natural rotation to a flow of water injected from the injector 60. The shape of the gas-liquid separator 70 may be cylindrical, quadrangular, triangular, etc. Among these, a cylindrical gas-liquid separator 70 is more stable for a flow of water. Also, the gas-liquid separator 70 has an upright structure to separate gas and liquid by means of gravity.

The upper portion of the gas-liquid separator 70 is closed, but a return line 54 is connected to an inlet 71 side of the gas-liquid separator 70 to recirculate undissolved ozone. Formed at the lower portion of the gas-liquid separator 70 is a passage 72 connected to a drainpipe 53. A removable cap 76 is situated on an opening formed on the upper portion of the gas-liquid separator 70.

As shown in FIGS. 2 and 5, the ozone water-backflow preventing unit includes a guide 73 fitted into the opening formed on the upper portion of the gas-liquid separator 70, a rod sensor 74 extended vertically below the upper portion of the gas-liquid separator 70 along the guide 73 within the gas-liquid separator 70 for detecting a water level within the gas-liquid separator 70 by defining a certain level point where the water level within the gas-liquid separator 70 reaches as a full water level, and a water solenoid valve 75 installed in the supply side of the water supply line 50 for controlling the water supply line 50 in response to information detected from the rod sensor 74.

The ozone water producing system including the influent air control unit 40, the injector 60, the gas-liquid separator 70 and the ozone water-backflow preventing unit can be publicly used for a household, business and industrial purpose through a suitable arrangement of constituent elements depending on a use purpose.

Now, the feature and operation of the ozone water-producing system according to the construction of the present invention will be described in detail hereinafter through an ozone water-producing process and an operation mode.

The featuring portion of the present invention is largely classified into five sections: (1) an injecting section 60 which adopts a complex structure of the heaters 43 and 43a connected to a driving circuit board 55 and the check valve 53 for allowing ozone generated from the ozone generator 20 to enter the injector 60 by means of a flow rate through the injection of water, (2) an ozone gas re-circulating section using the gas-liquid separator 70 which discharges an ozone gas not dissolved into water through an outlet of the upper portion of the gas-liquid separator 70 to re-introduce the discharged ozone gas into the water supply line 50 via the return line 54 and dissolve it into water in the water supply line 50 and which discharges the water containing dissolved ozone through an outlet of the lower portion of the gas-liquid separator 70, (3) a water-backflow control section which separates water and ozone when the water enters the gas-liquid separator 70 and intercepts a flow of water entering the gas-liquid separator 70 through the water solenoid valve 75 if the amount of accumulated water exceeds the water level limit within the gas-liquid separator 70 during separation or a standby process, (4) a control section for the water solenoid valve 75 which artificially delays the opening time of the water solenoid valve 75 in order to save the time required to discharge the overflowed water, and (5) a section which purifies polluted ambient air introduced into the ozone generator 20 and removes moisture via dried silica gel to continuously introduce clean and dried air into the ozone generator 20. Here, a dehumidifying effect of air introduced into the ozone generator 20 may vary with the arrangement of the heaters 43 and 43a. In case of maintaining a continuous operation of the system, one or more heaters 43 and 43a is disposed so that filtered air is first dried through one heater 43 to be introduced into the ozone generator 20 whereas when moisture is saturated in the dehumidifying layer 45 of the one heater 43 the dehumidifying layer 45 is dried through the PTC thermostat 47 while filtered air is dried through the other heater 43a to be introduced into the ozone generator 20. In this case, the air solenoid valve 30 adopts a 3-way flow channel scheme. But, one or more heaters may not necessarily be disposed. That is, if the operation time of the system is less than about 5 hours and a long dormant state lasts, the natural drying of the dehumidifying layer of the heater 43 or 43a is also possible so that a dehumidifying effect can be attained only by using one heater.

The operation of the ozone water producing system of the present invention will be described by assuming that two heaters 43 and 43a are applied to the system.

Figure 6:
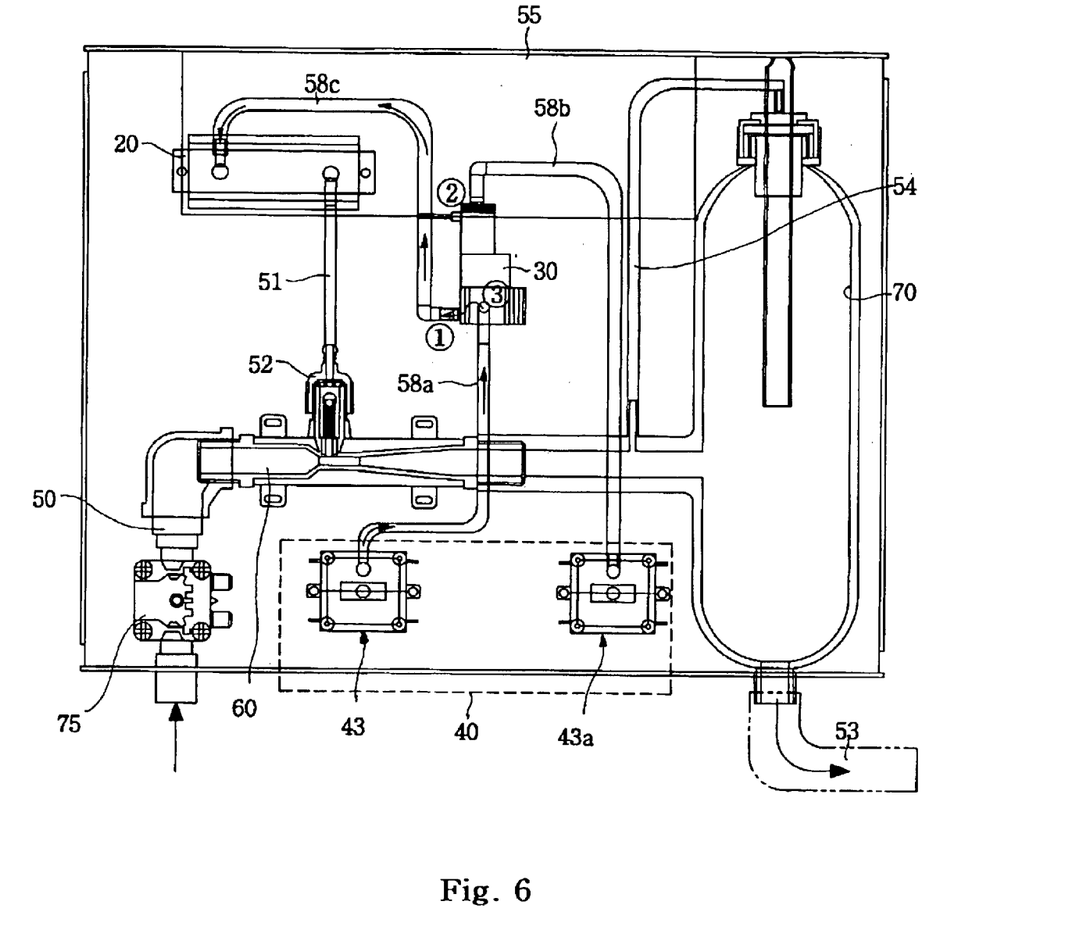
FIG. 6 is a view illustrating the operating condition of the system, especially a view for referring to a flow channel, which illustrates the air flowing state of a specific heating block.
Figure 7:
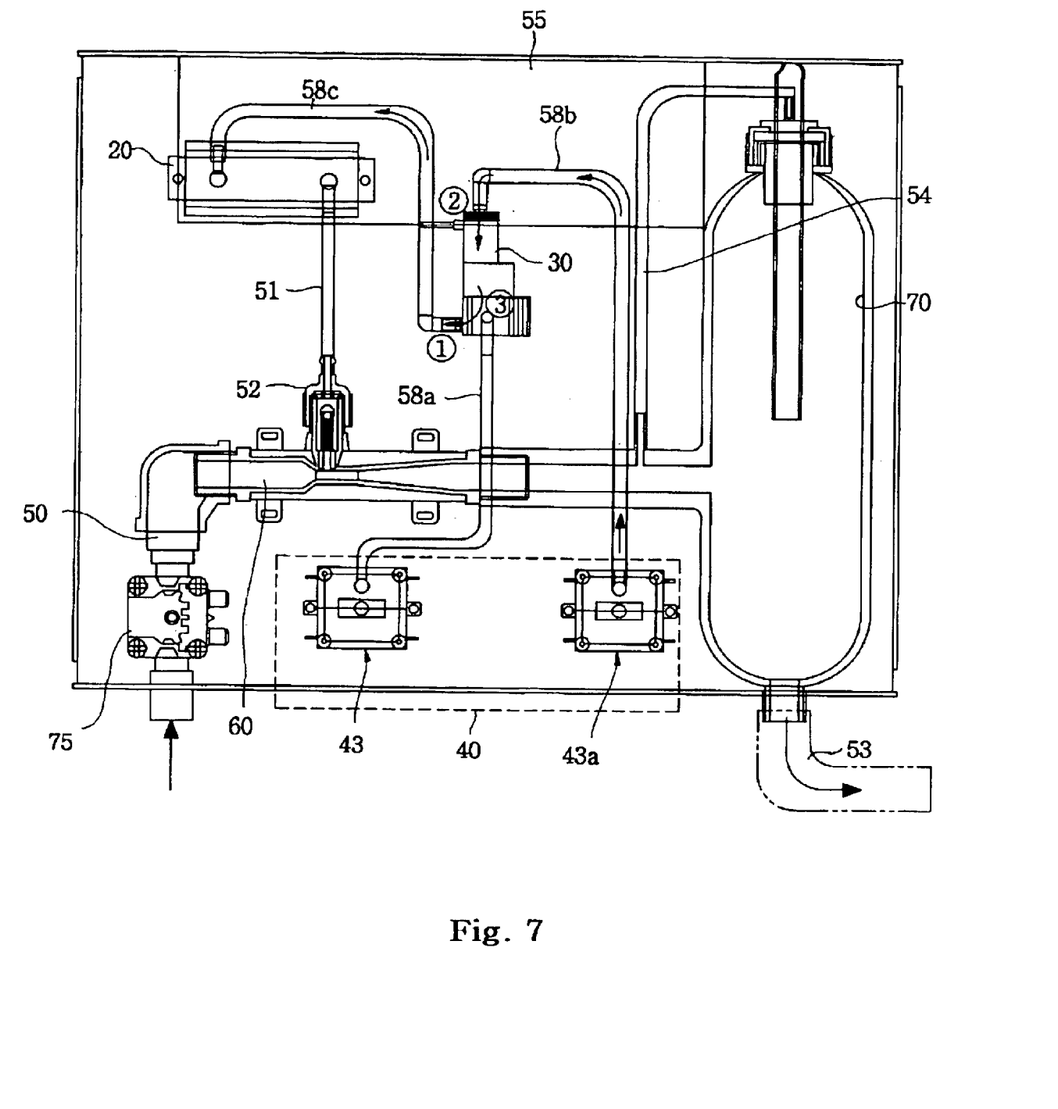
FIG. 7 is a comparative referring view of FIG. 6.

As show in FIGS. 6 and 7, when a switch (not shown) provided on the driving circuit board 55 is turned on, the water solenoid valve 75 is opened so that water is introduced into the water supply line 50.

At this moment, the ozone generator 20 detects a power supply signal of the driving circuit board 55 and applies an electric power to the ozone-generating unit built in the ozone generator 20 to intermittently or continuously generate ozone depending on a predetermined condition (the generating time and period of ozone can be controlled by the driving circuit board 55).

Then, water passes through the water solenoid valve 75 continuously and enters the injector 60, which, in turn, injects the water into the inner space thereof at a flow rate of water through a small injector hole 61 formed within the injector 60. At this time, ozone generated from the ozone generator 20 is sucked into the small injector hole 61 through the check valve 52 so that an ozone gas is dissolved into the water flowing in the injector 60 while being introduced into the gas-liquid separator 70.

In the flow process of water between the injector 60 and the gas-liquid separator 70, first ozone water, obtained by mixing and dissolving ozone into water in the injector 60, is introduced into the gas-liquid separator 70 via the injector 60. Ozone is subsequently dissolved into water to produce second ozone water in the gas-liquid separator 70. In this process, gas-liquid separator 70 discharges ozone water of a liquid state where ozone is dissolved into water through a drainpipe 53 while allowing ozone in a gaseous state, which is not dissolved in water, to re-enter the gas-liquid separator 70 through a return line 54 to experience third or more ozone-dissolving processes.

As show in FIG. 6, polluted ambient air is introduced into the heater 43 which, in turn, purifies the polluted ambient air through a filter thereof or removes moisture from the purified ambient air through a dried dehumidifying layer 45 to produce clean and dried air and to supply it to the ozone generator 20 through the air solenoid valve 30. At this time, the flow channel operating time of the heater 43 needed to pass though a flow path of ③→① is approximately 5 hours.

As shown in FIG. 7, in case of using another heater 43a, when the PTC thermostat element 47 of the heater 43a is activated in response to a driving signal of the driving circuit board 55, it sufficiently dries the saturated dehumidifying layer 45 of silica gel for about 1 hour. In this way, in the case of applying both the heaters 43 and 43a, they are alternately operated in such a manner that one heater 43 functions to purify and dry air whereas the other heater 43a functions to dry the dehumidifying layer 45 to perform a standby operation, so that clean and dried air can be continuously supplied to the ozone generator 20. At this time, after a lapse of the flow channel operating time (about 5 hours) of the heater 43, as shown in FIG. 7, the other heater 43a purifies and dries air to supply it to the ozone generator 20 along a flow path ②→① of the air solenoid valve 30. For reference, in case of producing ozone through the ozone-generating unit of the ozone generator 20, when a humidity of air is relatively low and the purity of the intake air? is high, the amount of produced ozone per unit time can be increased and the production of a high quality ozone is possible.

Figure 8:
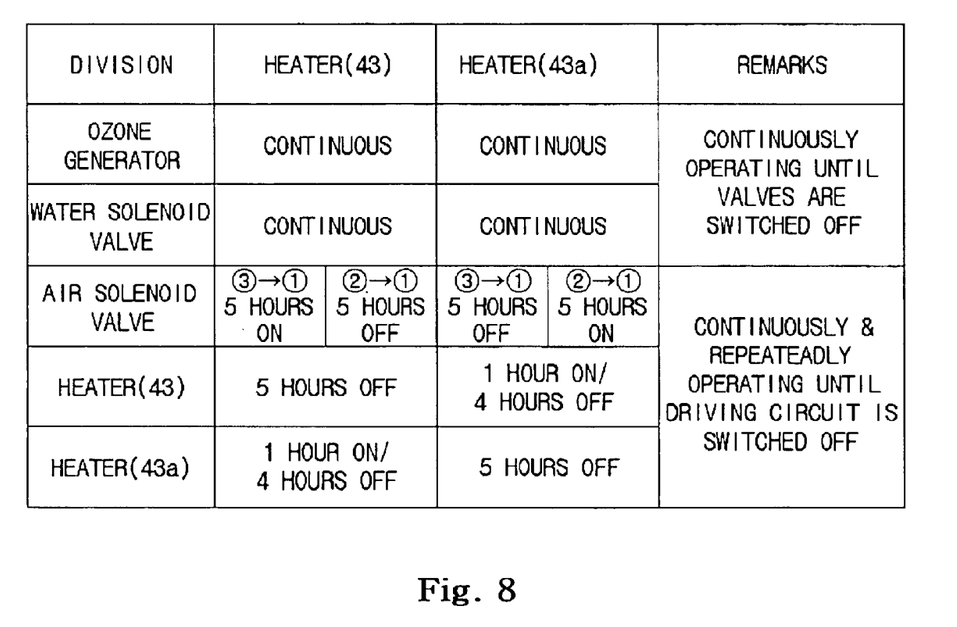
FIG. 8 is a table illustrating a comparison between the opening time of an air solenoid valve and the driving time of two heating blocks under the air influent condition for operating the two heating blocks according to an embodiment of the present invention.

FIG. 8 is a table illustrating a comparison between the opening time of the air solenoid valve 30 and the driving time of two heaters 43 and 43a under the air influent condition for operating the two heaters 43 and 43a according to an embodiment of the present invention.

In the meantime, the first ozone water obtained by mixing and dissolving into water in the injector 60 is introduced into the gas-liquid separator 70 which, in turn, dissolves ozone into water in the gas-liquid separator 70 to produces second ozone water, i.e., water containing dissolved ozone to discharge it through the drainpipe 53. The discharged second ozone water corresponds to the final product of ozone water to be obtained in the present invention.

At this time, ozone gas that is not dissolved into water flows toward an upper portion within the gas-liquid separator 70 and re-enters the gas-liquid separator 70 through the return line 54 so that ozone is thirdly dissolved into water in the gas-liquid separator 70. Consequently, the above ozone-dissolving process is performed repeatedly so that ozone is dissolved into water in the gas-liquid separator 70, without being discarded, to produce ozone water that is discharged through the drainpipe 53.

During operation of the ozone water-producing system, according to the present invention, if the drainpipe 53 is closed, the gas-liquid separator 70 fills with water. At this time, when the rod sensor 74 built into the gas-liquid separator 70 detects the water level limit in the gas-liquid separator 70, the water solenoid valve 75 is closed to prevent a backflow of ozone water. Then, since information about the detected water level limit can stop the driving of the ozone generator, the heating block and the other components, it is possible to prevent damage to the ozone water producing apparatus due to a backflow of ozone water.

The configuration for preventing a backflow of ozone water by detecting a water level in the gas-liquid separator 70 can selectively adopt any one of several schemes to predict a backflow of ozone water by detecting a hydraulic pressure in the gas-liquid separator 70, such as a scheme which applies a proximity sensor and a limit sensor for sensing the height of a water surface, a scheme which senses a backflow of ozone water by actuating a micro-switch to move it to a floating position of a reference scale using buoyancy, etc., as an alternative to a scheme using the rod sensor 75 which recognizes a direct contact with water as a water level limit as shown in FIG. 5.

Now, a method of controlling the ozone water-producing system according to the present invention will be described in detail.

First, water is supplied to the interior of the system by opening a water solenoid valve 75 serving to open and close a water supply line 50 in a driving circuit board 55, and ozone is mixed into the water by increasing a flow rate of the water through an injector 60 and sucking the ozone into the injector 60. Second, ozone is separated from water through a gas-liquid separator 70 to dissolve ozone into water containing dissolved ozone while restricting the discharge of undissolved ozone so as to recirculate and re-dissolve the ozone into the water. Third, water is continuously supplied to the gas-liquid separator 70 in the gas-liquid separating process and in response to a blocking of an outlet provided on the lower portion of the gas-liquid separator 70 a state where a discharge of water stoppage is detected as an abnormal water level in the gas-liquid separator 70. Fourth, the water solenoid valve 75 is blocked and the outlet on the lower portion of the gas-liquid separator 70 is opened to discharge water in the gas-liquid separator 70 through the outlet if water level detecting information from the gas-liquid separator 70 indicates a full water level. Lastly, a discharge state of water is identified through a detecting sensor after all the water in the gas-liquid separator 70 is discharged and the water solenoid valve 75 is actuated to re-supply water to the gas-liquid separator 70 through the water supply line 50 after an optional delay time elapses.

Figure 9:
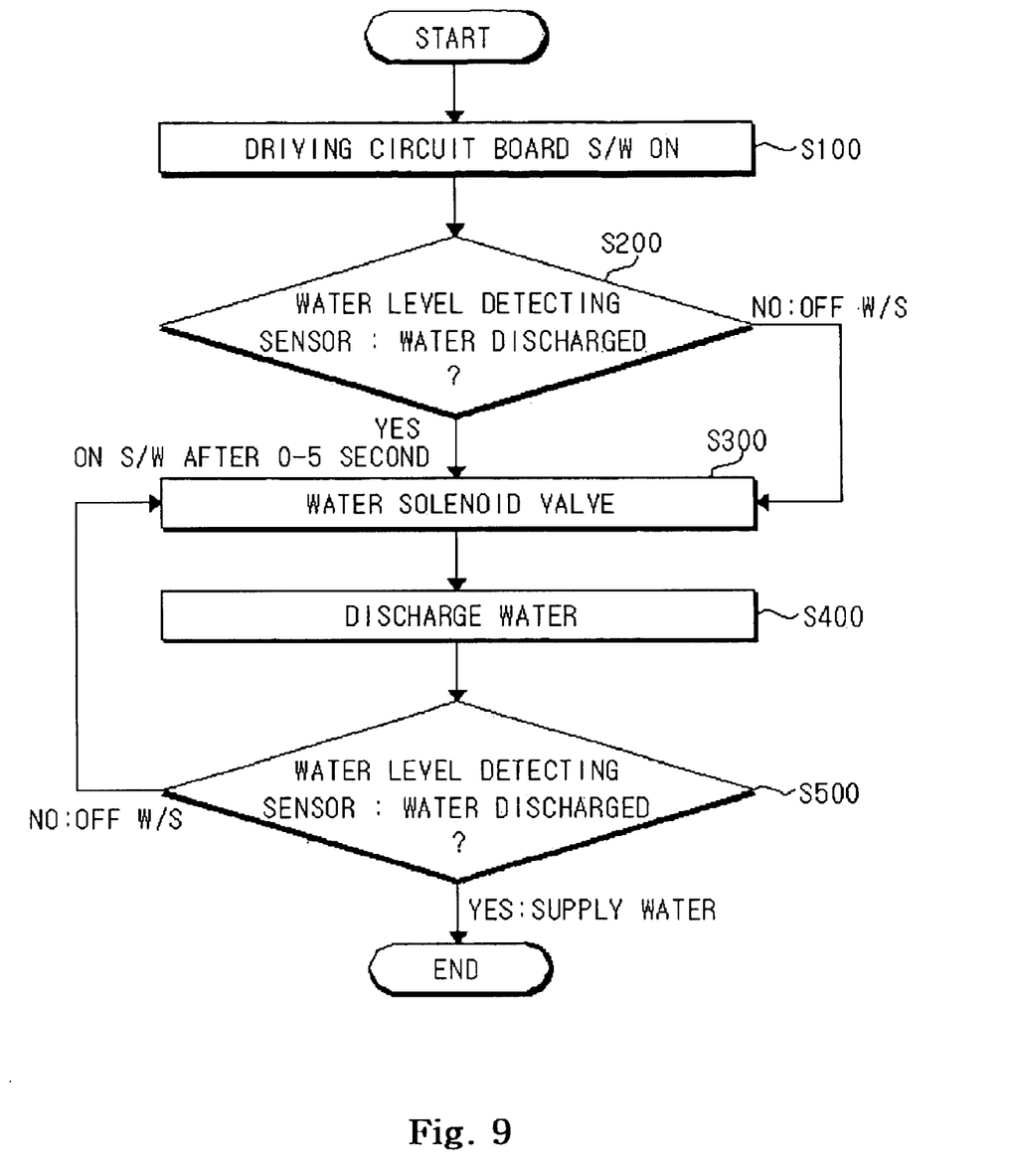
FIG. 9 is a flowchart illustrating a controlled method of delaying the time when water will be re-supplied according to the construction of the gas-liquid separator of FIG. 5.

FIG. 9 is a flowchart illustrating an example of a controlled method (a delay circuit) of delaying the time when water will be re-supplied according to the basic construction of the gas-liquid separator 70 of FIG. 5.

The time needed to delay a re-supply of water is set to be larger than the time required to discharge water in the gas-liquid separator 70. That is, a delay of the re-supply of water is intended to again supply water to the gas-liquid separator 70 after sufficiently discharging water accumulated in the gas-liquid separator 70 according to the interruption of a discharging of water. Such a water re-supply delaying operation will be described hereinafter under the condition where a rod sensor is employed as a water level detecting sensor.

Referring to FIG. 9, first, at S100, when a driving power is applied to the driving circuit board 55, i.e., the driving circuit board 55 is switched on, the program proceeds to step S200 in which the water lever detecting rod sensor 74 determines whether or not a discharging of water is completed, i.e., water filled into the gas-liquid separator 70 has been exhausted by external manipulation (automatic manipulation or artificial manipulation) in a state where the water solenoid valve 75 is closed. If it is determined at step S200 that the answer is YES, i.e., the discharging of the water is complete, the program proceeds to step S300 where an electric power is again applied to the water solenoid valve 75, i.e., the water solenoid valve is switched on, after 0–5 seconds after the rod sensor 74 is separated from the water, and water is again supplied to the gas-liquid separator 70 (S400–S500). Consequently, the water re-supply delaying process is concluded. Alternatively, during an initial operation, since water accumulated in the gas-liquid separator 70 is in contact with the rod sensor 74 and the water solenoid valve 75 is closed, the water solenoid valve 75 is opened after discharging the filled water automatically for a certain time period (0–5 seconds) using a delay circuit, so that water is again supplied to the gas-liquid separator 70 (S100–S500). As a result, the water re-supply delaying process is concluded. Therefore, both the water re-supply delaying processes may be employed selectively. Such a control method may vary according the function of a water level detecting sensor and the condition of the gas-liquid separator 70.

As described above, the ozone water-producing system, according to the present invention, has an advantage in that since it is easily and simply installed indoors or outdoors according to a use purpose of various kinds of water such as city water, underground water, industrial and agricultural water, environmental purifying water, public health and hygiene processing water, etc., so that a large quantity of water is continuously processed to produce ozone water, it can be effectively used to reproduce polluted water so that it is once again environmentally friendly.

In addition, there is ensured system stability which is not obtained from a conventional ozone water-producing system, and the condition of ozone generation is maintained in an optimum state to improve the performance of the system in its entirety as well as allow unmanned operation.

Moreover, a backflow of water occurring highly frequently during the operation of the conventional ozone water-producing system is prevented so that stability and performance of the system are improved and operation life time is extended, which makes it possible to manufacture a highly reliable ozone water producing apparatus.

The forgoing embodiments are merely exemplary and are not to be construed as limiting the present invention. The description of the present invention is intended to be illustrative and not to limit the scope of the claims. Many alternatives, modifications, and variations will be apparent to those skilled in the art.

What is claimed is:

1. An ozone water-producing system including an ozone generator having an ozone generating unit for receiving air and changing oxygen contained in the received air into ozone to generate the ozone, a mixer adapted to mix the ozone supplied from the ozone generator with water supplied from a water source, a solenoid valve installed in a water supply line to control a flow of water supplied to the mixer from the water source and a gas-liquid separator adapted to separate gas and liquid, the ozone water producing system comprises:

an influent air control means adapted to purify and dehumidify intake air passing through an air solenoid valve installed the flow path of ambient air introduced into an ozone generator;

an injector connected to a water supply line and an ozone gas supply line so as to form an ozone gas from air purified and dried through the influent air control means and mix the ozone gas with water, the injector adapted to open a check valve installed at a position where the ozone gas supply line and the water supply line meet by means of water injection through a flow rate of water to allow the ozone gas to be dissolved into water;

a gas-liquid separator having a certain space enabling a separation of gas and liquid and adapted to perform a repeated ozone dissolving process in such a manner that it receives first ozone water obtained by mixing and dissolving the ozone gas into the water via the injector, allowing ozone to subsequently be dissolved into water to produce second ozone water in the gas-liquid separator and discharges ozone water in a liquid state consisting of ozone dissolved in water through a drainpipe while allowing ozone in a gaseous state which is not dissolved in water to re-enter the gas-liquid separator through a return line to allow ozone to thirdly be dissolved into water to produce ozone water in the gas-liquid separator; and an ozone water-backflow preventing means installed along the interior space of the gas-liquid separator and adapted to detect a limit water level of the ozone water accumulated in the gas-liquid separator and control a flow of water through the water supply line according to the flow state of the ozone water to prevent a backflow of the ozone water.

2. The ozone water-producing system according to claim 1, wherein the influent air control unit comprises a heater on a jacket having an air intake port and an empty interior space, a filter installed at the air intake port of the jacket and adapted to filter air sucked into the filter, a dehumidifying layer disposed in the empty interior space of the jacket and adapted to remove moisture contained in air passing through the filter.

3. The ozone water-producing system according to claim 1, wherein the injector is connected at one end to the water supply line and connected at the other end to the gas-liquid separator, and has a check valve installed at an external side of the region where a flow channel narrows to be opened or closed under a certain pressure and an injector hole for allowing the passage of ozone gas into the flow channel of the injector through the check valve, as induced via the Venturi effect due to the high speed flow of water supplied to the injector through the water supply line.

4. The ozone water-producing system according to claim 1, wherein the ozone water-backflow preventing unit includes a guide fitted into the opening formed on the upper portion of the gas-liquid separator, a rod sensor extended vertically below the upper portion of the gas-liquid separator along the guide within the gas-liquid separator for detecting a water level within the gas-liquid separator by defining a certain point where the water level within the gas-liquid separator reaches as a full water level, and a water solenoid valve installed at a supply side of the water supply line for controlling the water supply line in response to information detected from the rod sensor.

5. A method of controlling an ozone water-producing system for producing ozone, comprising the steps of:

supplying water to the interior of the system by opening a water solenoid valve serving to open and close a water supply line in a driving circuit board, and mixing ozone into the water by increasing a flow rate of the water through an injector and sucking the ozone into the injector;

separating ozone from water through a gas-liquid separator to dissolve ozone into water containing dissolved ozone while restricting a discharge of ozone which is not dissolved into the water so as to re-circulate and re-dissolve ozone into the water;

continuously supplying water to the gas-liquid separator in the gas-liquid separating process and in response to a blocking of an outlet provided on the lower portion of the gas-liquid separator and detecting a state where a discharge of water is stopped as an abnormal water level in the gas-liquid separator;

blocking the water solenoid valve and opening the outlet on the lower portion of the gas-liquid separator to discharge water in the gas-liquid separator through the outlet if water level detecting information from the gas-liquid separator indicates a full water level; and identifying a discharge state of water through a detecting sensor after all the water in the gas-liquid separator is discharged and actuating the water solenoid valve to re-supply water to the gas-liquid separator through the water supply line after an optional delay time elapses.

* * * * *